United States Patent
Kim et al.

(10) Patent No.: US 8,032,516 B2
(45) Date of Patent: Oct. 4, 2011

(54) METHODS AND SYSTEMS THAT PROVIDE UNIFIED BILLS OF MATERIAL

(75) Inventors: Yung S. Kim, Bellevue, WA (US); Thomas H. Bluhm, Auburn, WA (US)

(73) Assignee: The Boeing Company, Chicago, IL (US)

( * ) Notice: Subject to any disclaimer, the term of this patent is extended or adjusted under 35 U.S.C. 154(b) by 513 days.

(21) Appl. No.: 12/183,627

(22) Filed: Jul. 31, 2008

(65) Prior Publication Data
US 2010/0030767 A1 Feb. 4, 2010

(51) Int. Cl.
*G06F 17/30* (2006.01)
(52) U.S. Cl. .................. 707/713; 707/736
(58) Field of Classification Search .......... 707/708, 707/710, 713, 722, 726, 736
See application file for complete search history.

(56) References Cited

U.S. PATENT DOCUMENTS

| | | | |
|---|---|---|---|
| 5,185,857 A * | 2/1993 | Rozmanith et al. .......... 715/207 |
| 5,197,001 A | 3/1993 | Mukherjee | |
| 7,043,324 B2 | 5/2006 | Woehler | |
| 7,213,037 B2 | 5/2007 | Rangadass | |
| 7,236,973 B2 | 6/2007 | Kalthoff et al. | |
| 7,310,646 B2 | 12/2007 | Rangadass et al. | |
| 2008/0016040 A1* | 1/2008 | Jones et al. ................ 707/3 |
| 2008/0097966 A1* | 4/2008 | Choi et al. ................ 707/3 |
| 2008/0140281 A1* | 6/2008 | Morris et al. ............ 701/33 |
| 2008/0140640 A1* | 6/2008 | Raff ....................... 707/5 |
| 2008/0195610 A1* | 8/2008 | Tin et al. .................... 707/6 |
| 2009/0013068 A1* | 1/2009 | Eaglestone et al. ....... 709/224 |

* cited by examiner

*Primary Examiner* — Angela Lie
(74) *Attorney, Agent, or Firm* — Armstrong Teasdale LLP

(57) ABSTRACT

A method for presenting a user with a unified bill of material from a plurality of bills of materials respectively stored in multiple databases is disclosed. The method includes receiving at least one keyword from the user, querying a taxonomy associated with the at least one keyword, utilizing a semantic based ontology model to generate queries for forwarding to the databases, the queries based on the taxonomy and the at least one keyword, receiving from the databases, a listing of the available information stored in the databases that includes the at least one keyword, presenting the listing to the user, receiving from the user, based on the listing, a selection of the information they wish to retrieve from the databases, generating a query requesting retrieval of the user selected information from the databases, receiving the retrieved information from the databases, and providing the retrieved information in an organized format.

14 Claims, 8 Drawing Sheets

METHODS AND SYSTEMS THAT PROVIDE UNIFIED BILLS OF MATERIAL

BACKGROUND OF THE INVENTION

The field of the invention relates generally to bills of materials, and more specifically, to methods and systems that provide unified bills of materials.

The bill of materials (BOM) is an official description of a product. As the information contents for a product evolve over the product lifecycle, there is not one, but many bills of materials. Specifically, each bill of materials represents a different functional domain perspective of the product lifecycle. Examples include engineering, manufacturing, sales, and service or support. These bills of materials are often stored in dissimilar databases in different locations since the bills of materials are serving the diverse purposes, for example, of the various groups listed above.

There are generally difficulties in the identification, retrieval, and/or collaboration on a correct bill of materials, even in the networked environment. At least one of the reasons there are difficulties is that generally each site has it's own unique access procedure. In other words, there generally is no standard access procedure between the various sites of large enterprises. Another challenge is to find the correct access method for a desired BOM depending on the system on which the BOM is sourced.

These issues are currently addressed through manual processes. Specifically, accessing a desired BOM is a manual process that includes searching for the BOM location to retrieve the BOM data, even though the BOM data are stored in computing systems. With respect to operations across an enterprise, BOMs are generated, stored, and used, for example, by engineering, manufacturing, and finance domains. Each domain generates a BOM that is distinct from the BOMs associated with other domains. Therefore, the various BOMs are often not consistent, nor compatible with each other in terms of contents and data types making it unbearably difficult for the users to intuitively find the desired BOM data. At least one reason for these difficulties is because there are no embedded semantics in the procedure. User difficulties increase when the BOM systems need scaling-up or down to accommodate business demand changes. To ease the increasing difficulties, the BOM database may be replicated between remote sites. However, the replication process is complex, slow, and error prone especially when product configuration changes are frequent.

BRIEF DESCRIPTION OF THE INVENTION

In one aspect, a method for presenting a user with a unified bill of materials from a plurality of bills of materials stored in a plurality of databases is provided. The method includes receiving at least one keyword from the user, querying a taxonomy associated with the at least one keyword, utilizing a semantic based ontology model to generate queries for forwarding to the databases, the queries based on the taxonomy and the at least one keyword, receiving from the databases, a listing of the available information stored in the databases that includes the at least one keyword, presenting the listing to the user, receiving from the user, based on the listing, a selection of the available information they wish to retrieve from the databases, generating a query requesting retrieval of the user selected information from the databases, receiving the retrieved information from the databases, and providing the retrieved information to the user in an organized format.

In another aspect, a system configured to provide a unified bill of materials to a user from a plurality of bills of materials is provided. The system includes a user dashboard having a user interface, a plurality of databases each having a bill of materials stored therein, and an ontology server communicatively coupled to the user dashboard and the databases. At least two of the databases have a bill of materials stored therein in respectively different formats. The user dashboard is configured to provide an ability to scan the databases to automatically search for keyword related items. The ontology server is configured to receive at least one keyword from the user dashboard via the user interface, query a taxonomy associated with the at least one keyword, utilize an ontology model to generate queries for identifying and forwarding to the databases, the queries based on the taxonomy and the at least one keyword, generate a listing of the available information stored in the databases that includes the at least one keyword based on received responses to the queries for display on the user interface, receive selections from the user dashboard of the available information to be retrieved from the databases, generate queries requesting retrieval of the selections from the databases, the queries in a format compatible with the at least two databases, and receive the retrieved information from the respective databases, and provide the retrieved information representing explicit domain knowledge to the user.

In still another aspect, a network is provided that includes a plurality of communicatively coupled computers and a plurality of databases where at least two of the databases have a bill of materials stored therein, at least two of the bills of materials stored in respectively different formats. One of the computers is programmed with a user dashboard and further configured to provide access to an ontology server executed by one of the computers. The one of the computers is programmed to access a semantic based ontology model operating on the ontology server to generate queries for forwarding to the databases, where the queries are based on a taxonomy and an associated one keyword. The ontology server is configured to provide a selectable listing of the available information stored in the databases, the available information provided as a result of the queries, receive, via entry through the user dashboard, a user selection of one or more of the available information they wish to retrieve from the databases, request retrieval of the user selections from the databases, and provide the retrieved information to the user in an organized format at the one of computers.

DETAILED DESCRIPTION OF THE INVENTION

At least one embodiment described herein relates to a machine readable semantic method that enables users to seamlessly process bills of materials, even though those bills of materials may originate from different perspectives of an enterprise. The processing is independent of system types and geographic locations, which provides improved support of product lifecycle operations. To provide such seamless processing, the semantic-based method is utilized to search, identify, extract, and compose bill of materials contents needed by a user in a consistent manner for multiple business needs. The bill of materials contents are accessed independent of database types and within a heterogeneous computing environment.

Figure 1:
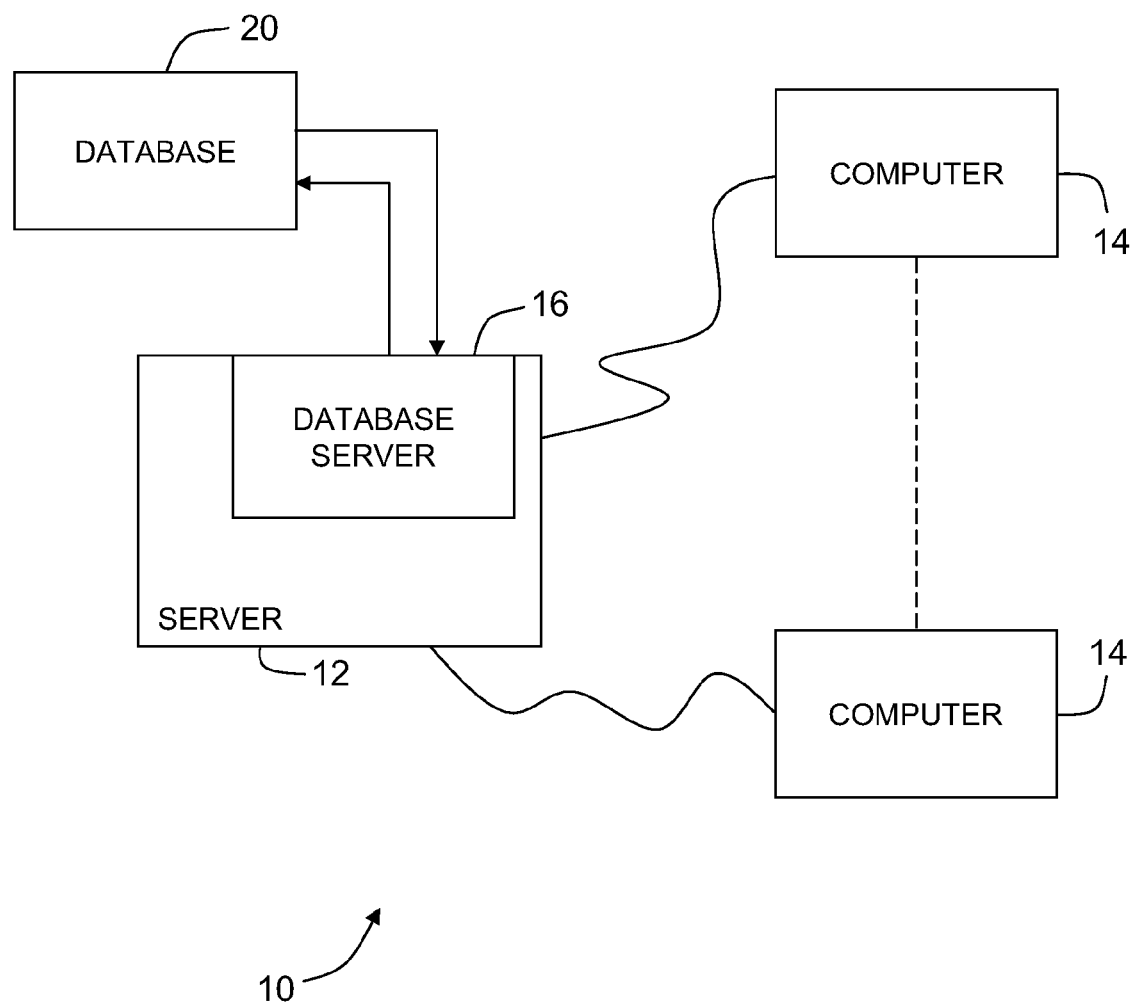
FIG. 1 is a simplified block diagram of a computer system.

FIG. 1 is a simplified block diagram of an exemplary system 10 including a server system 12, and a plurality of client sub-systems, also referred to as client systems 14, connected to server system 12. As used herein, the term exemplary indicates an example and not necessarily an ideal. Computerized modeling and grouping tools, as described below in more detail, are stored in server 12, and can be accessed by a requester at any one of computers 14. In one embodiment, client systems 14 are computers including a web browser, such that server system 12 is accessible to client systems 14 using the Internet. Client systems 14 are interconnected to the Internet, or alternatively to an Intranet, through many interfaces including a network, such as a local area network (LAN) or a wide area network (WAN), dial-in-connections, cable modems, and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized. While a user is generally a human person, the described embodiments may also be practiced where the query/response exchanges described below are exchanged between automated computer systems.

Figure 2:
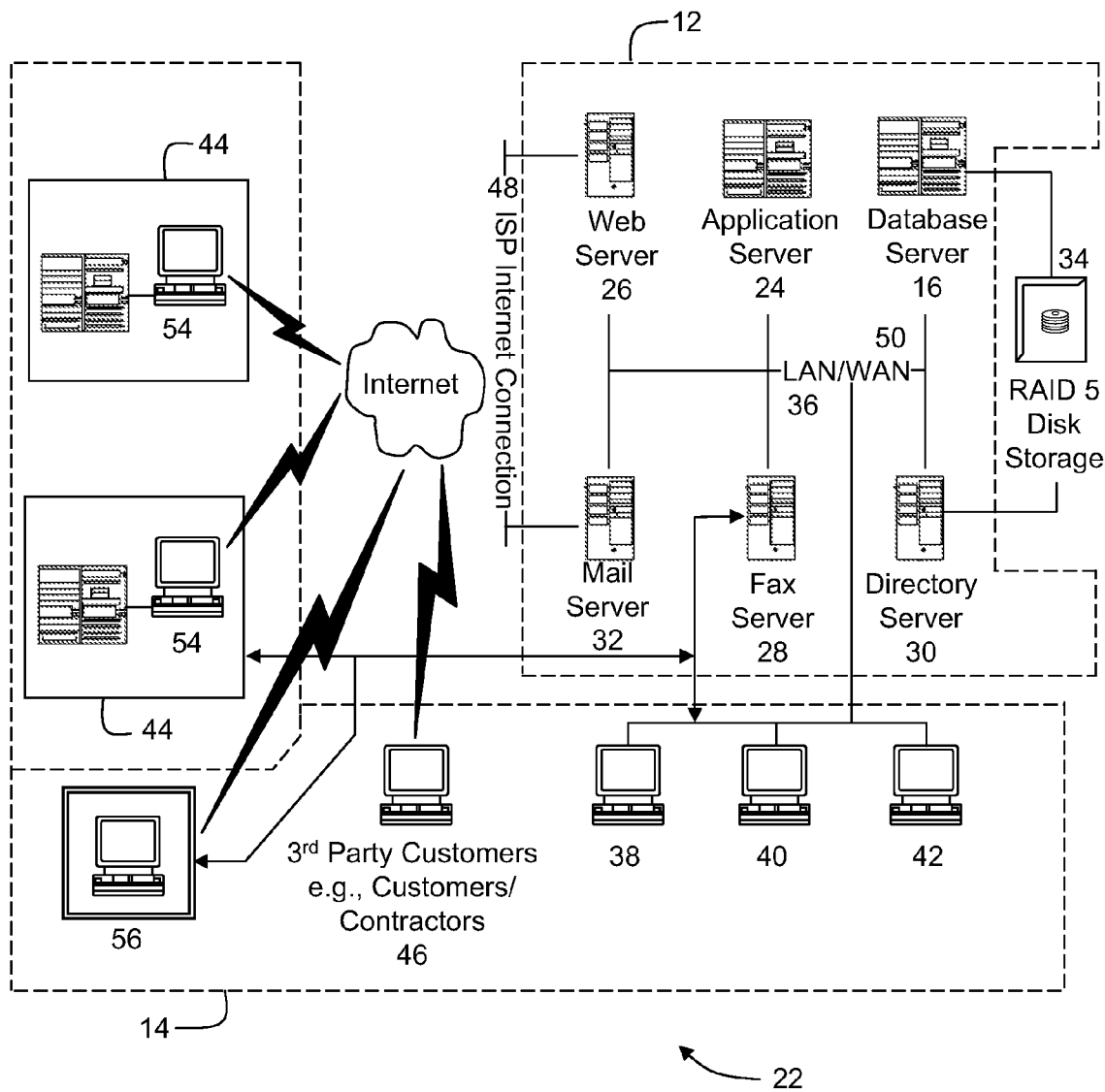
FIG. 2 is a block diagram of a computer network.

FIG. 2 is an expanded block diagram of an exemplary embodiment of a system 22. System 22 is but one example of a suitable computing environment and is not intended to suggest any limitation as to the scope of use or functionality of the present disclosure. Neither should the system 22 be interpreted as having any dependency or requirement relating to any one or combination of components illustrated herein. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 (which includes database 20) is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 using an Internet link or are connected through an Intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

Server system 12 is configured to be communicatively coupled to various individuals, including employees 44 and to third parties, e.g., customers/contractors 46 using an internet service provider (ISP) Internet connection 48. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 50, local area network 36 could be used in place of WAN 50.

In the exemplary embodiment, any authorized individual having a workstation 54 can access system 22. At least one of the client systems includes a manager workstation 56 located at a remote location. Workstations 54 and 56 are personal computers having a web browser. Also, workstations 54 and 56 are configured to communicate with server system 12. Furthermore, fax server 28 communicates with remotely located client systems, including a client system 56 using a telephone link. Fax server 28 is configured to communicate with other client systems 38, 40, and 42 as well.

Utilizing the systems of FIGS. 1 and 2, an ability to share the reusable semantics of various bills of materials is provided for global collaboration across business enterprises.

Generally, databases incorporate a tight coupling between the data stored therein and a data structure. This tight coupling implies that database users are constrained by the database structure, which makes database operations very inflexible for the functional domain experts. The tight coupling between the data and the database structure is intended to facilitate use of the data by users. However, effectiveness of the database data is hampered by system structure, which is unrelated to the domain knowledge. The embodiments described herein are independent of the various database system domains as their execution is driven by domain semantics (or domain processes) that are familiar to the structure of the database. Therefore it is possible to integrate data access and retrieval operations across the dissimilar database system domains. In the described embodiments, users focus only on the data needed from a BOM, instead of dealing with the entire BOM contents. This methodology minimizes the amount of work performed by a user.

In one embodiment, graphical process models are utilized which provide flexibility. In other words, operations are scalable through the simple connection of additional domain process models. The described embodiments also describe a BOM data access method that is consistent across physical locations as well as across the product lifecycle, which provides for true information sharing, by exchanging the meaning of the data in addition to the data itself among the enterprise domains.

A bill of materials describes a product in terms of its assemblies, sub-assemblies, and component parts along with other associated attributes. The BOM is an authoritative document for product development. The product complexity may mandate quite a few cycles of product development. In each cycle, the BOM not only introduces new and different types of information, but its volume grows as the product gradually matures.

Figure 3:
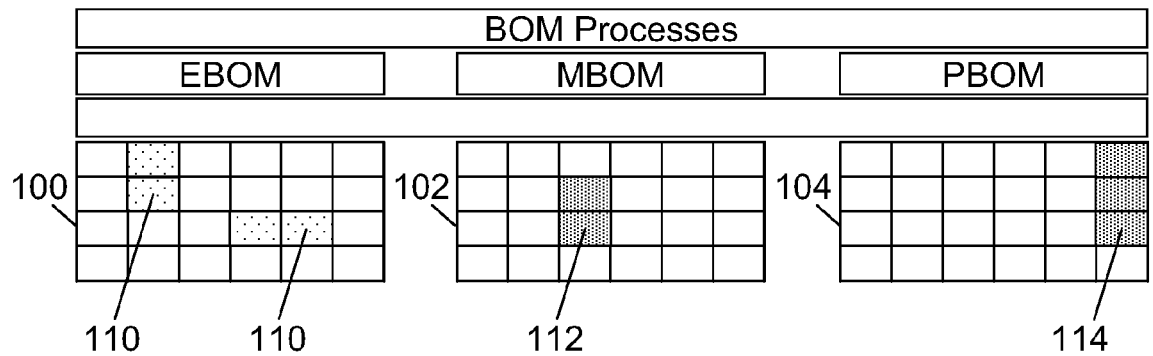
FIG. 3 is a diagram illustrating various bills of materials (BOM) processes, including indications of only BOM data sets from each of the BOM processes that a user desires to access.

As illustrated in FIG. 3, the BOM designation also changes in order to reflect the nature of its contents for each cycle. In one example, an engineering bill of materials (EBOM) 100 is utilized for a design cycle, a manufacturing bill of materials (MBOM) 102 is utilized during a production phase, and a purchase bill of materials (PBOM) 104 is utilized in conjunction with procurement activity. Other enterprises may include a service bill of materials (SBOM) for post-delivery product support (not shown in FIG. 3) or other bills of materials.

These BOMs are developed and validated by a group of subject matter experts representing various functions in each product development cycle. The validated BOMs are to be used by all product development teams consisting, for example, of engineers and managers participating in the product development as well as product development partners and suppliers. Most of the partners and suppliers are often geographically dispersed in the global scale. The official BOMs are either distributed over the vast region in order to reach participating business entities or the prime product developer must keep the BOM resources at a central location and then provides each participating business entity the access method to the central BOM location.

Figure 4:
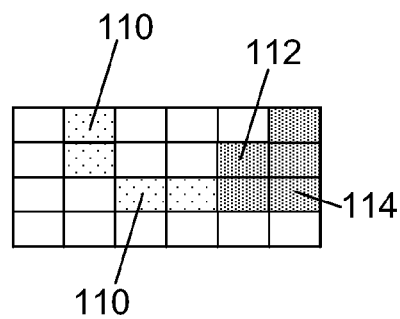
FIG. 4 is a diagram illustrating the resulting composed BOM data that the user selected to access via a unified BOM method.

It is desired to bring discrete BOM information to the right business entity in timely fashion. As is depicted in FIG. 3, the business entity may need particular data from all three of the EBOM 100, the MBOM 102, and the PBOM 104. Shading denotes the desired information 110, 112, and 114 from each of the respective BOMs 100, 102, and 104. As described above, it is challenging to identify discrete BOM data and bring them to the right participants at the right time, which is represented by FIG. 4, which shows the desired information 110, 112, and 114 from each of the respective BOMs in a single data set 120.

As described elsewhere herein, the discrete BOMs 100, 102, and 104 may reside in an automation jungle of many dissimilar and incompatible Product Data Management (PDM) devices or systems. To access the needed data from the disparate BOMs 100, 102, and 104, a user is required to identify which PDM system(s) and where the PDM system is physically located before getting access to the desired BOM databases. Once the relevant systems and locations are identified, the user generally has to obtain access permission to the specific PDM systems that have the disparate BOMs 100, 102, and 104 incorporated thereon. The user also has to learn how to run each PDM system in order to access the BOM data. With such inherent system mismatches, the average flow time to get BOM data is not in hours, but in days and weeks. Such delays generally impact product development process flow without adding any value to the product under development.

Problems are also inherent in the BOM data itself. Generally, a BOM structure is hierarchical in nature and often runs over multiple levels. As such, it is not uncommon to have hundreds or thousand of part numbers for a single product. In certain product areas, the sheer size of the BOMs impact many team activities. There are two types of difficulties from the user perspective. The user has to follow several pre-defined access steps mandated by the database systems, and the user must read each line one by one in order to understand its contents. This review process becomes often very tedious and time consuming. The embodiments provide a convenient and simple capability for users to instantly choreograph (search) and orchestrate (retrieve) only desired and discrete BOM information regardless of PDM types or geographical distances.

Figure 5:
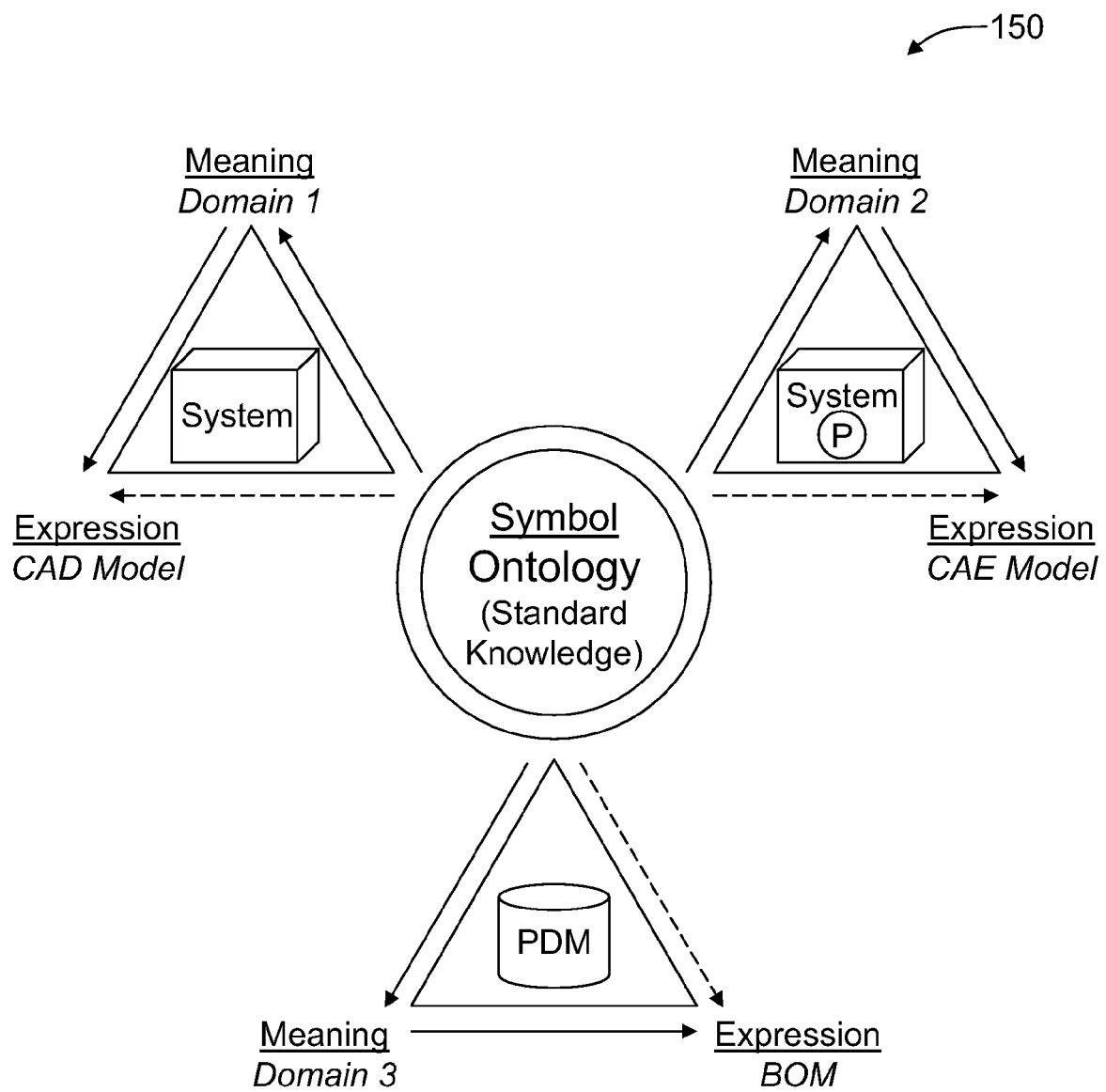
FIG. 5 is a diagram that illustrates a semantics framework for enabling the unified BOM management technology.

FIG. 5 is a diagram 150 that illustrates a semantics framework for BOM management. The above paragraphs address the typical BOM related issues stemming from the complexity and massive amount of data to process. These issues contribute to low productivity, which is only exasperated in global business operations. This complexity is addressed, and reduced in the described embodiments by introducing a semantics enabled method to the business operation. The embodiments are based on a semantics framework that provides the capabilities of understanding, discerning, and relating information in the BOM context for users. The semantics framework leads a capability to process and manage BOM information independent of systems and databases.

The described embodiments provides a method for users to access any combination of multiple dissimilar databases and search for a single or group of data they wish to access, via keywords. This search capability is semantically enabled to identify the user requested BOM information by context. In other words, the search capability has, for instance, an ability to discern between, for example, an EBOM and a MBOM (or other BOMs). This context driven methodology increases a users chance of accessing the desired BOM data on the first attempt, optimizing the response time regardless of the volume of database records.

This semantic richness is brought about through utilization of a graphical model that consists of many semantic primitives with each composed from three principal knowledge elements within a computer readable model. Referring specifically to FIG. 5, the three principal knowledge elements include meaning (represented by Domain), expression (represented by a BOM, a CAE model, or a CAD model), and symbol. The meaning knowledge element carries context such as business values, steps, or parts to produce. The expression knowledge element describes what the context is about specifically. The symbol knowledge element is a common sign for communication among semantics. The symbol knowledge element provides a mechanism to combine or integrate dissimilar concepts, relationships, knowledge without any limitation. The type of semantics structure described is converted to a computer readable map which can execute intelligent functions via a standard framework. These three knowledge elements are combined and executed within an existing computing infrastructure, replacing tasks that are generally performed manually by one or more users.

Figure 6:
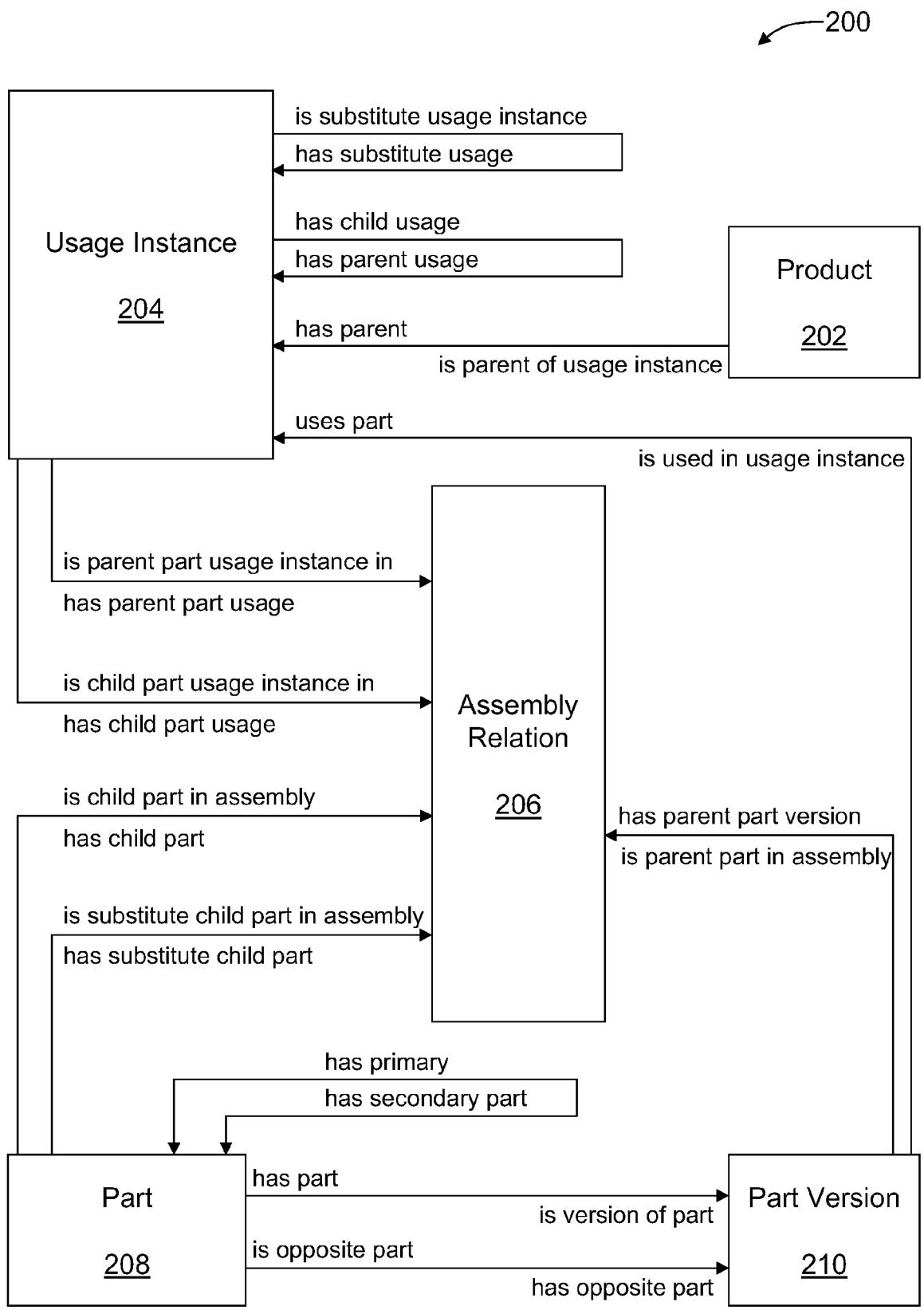
FIG. 6 is an illustration of a logical information flow for the unified BOM ontology model.

The unified BOM model 200 shown in FIG. 6 illustrates a top level base capability on that is computer executable through the use of the three principal knowledge elements described above. In model 200, each of product 202, usage instance 204, assembly relation 206, part 208, and part version 210 denote a subject for an action or activity. Each of the arrow line extending from these subjects indicates a relationship with other subjects. This unified BOM model 200 depicts the relationships between the BOM elements such as Product, Usage Instance, Assembly Relation, Part, and Part Version. These relationships are critical for automatic choreographing into the BOM resources for search, identify and retrieval operations when the users make a request. The relationship between the interfacing elements can be one-to-many, many-to-one, or many-to-many. This relationship map enables the users to access multiple BOM resources by using the same method. This feature addresses the scalability issues the users face when dealing with many dissimilar BOM systems remotely. The scalability of the BOM resources can occur in three different ways: 1) too large number of component parts in the BOM system, 2) too large number of instantiated parts in the BOM system, and 3) large numbers or complex BOM configuration conditions. There are several conventions to following model 200. When two of the subject boxes are connected with one arrow line connecting them, the words in the originating subject box are construed as a subject and then reading is continued, following the verb closer to the next subject box. One example is that usage instance 204 has as a parent the product 202, or stated alternatively, product 202 is the parent of usage instance 204.

When a subject box has an arrow extending therefrom and returning thereto, the words in the subject box as construed as a subject and then reading is continued, following the verb closer back to the subject box. One example is that usage instance 204 is a substitute usage instance. Stated alternatively, the words in a subject box are construed as a subject and then the line is farther taken from the box. (ex. usage instance 204 has substitute usage). The Usage Instance has the relationship to itself when the arrow is going outward meaning it can substitute for zero or more Usage instances. The reverse direction indicates that there is only one substitute instance at most. When one subject box is connected to several other different boxes the above is applied as appropriate.

Each Usage Instance 204 is substituted for zero or more Usage Instances 204. Each Usage Instance 204 has (at most) one substitute Usage Instance 204. Each Usage Instance 204 has zero or more child Usage Instances 204. Each Usage Instance 204 has (at most) one parent Usage Instance 204. Each Usage Instance 204 has one parent Product. Each Product 202 is the parent of zero or more Usage Instances 204. Each Usage Instance 204 is parent part usage instance in zero or more Assembly Relations 206.

Each Assembly Relation 206 has one parent part Usage Instance 204. Each Usage Instance 204 is a child part usage instance in zero or more Assembly Relations 206. Each Assembly Relation 206 has one child part Usage Instance 204. Each Usage Instance 204 uses one Part Version 210. Each Part Version 210 is used in zero or more Usage Instances 204. Each Assembly Relation 206 has one parent Part Version 210. Each Part Version 210 is the parent part in zero or more Assembly Relations 206.

Each Part 208 is a child part in zero or more Assembly Relations 206. Each Assembly Relation 206 has one child Part 208. Each Part 208 is substitute child part in zero or more Assembly Relations 206. Each Assembly Relation 206 has (at most) one substitute child Part 208. Each secondary Part 208 has zero or more primary Parts 208. Each primary Part 208 has one or more secondary Parts 208. Each Part 208 has zero or more Part Versions 210. Each Part Version 210 is a version of one Part 208. Each Part 208 is the opposite part for zero or more Part Versions 210. Each Part Version 210 has (at most) one opposite Part 208.

Figure 7:
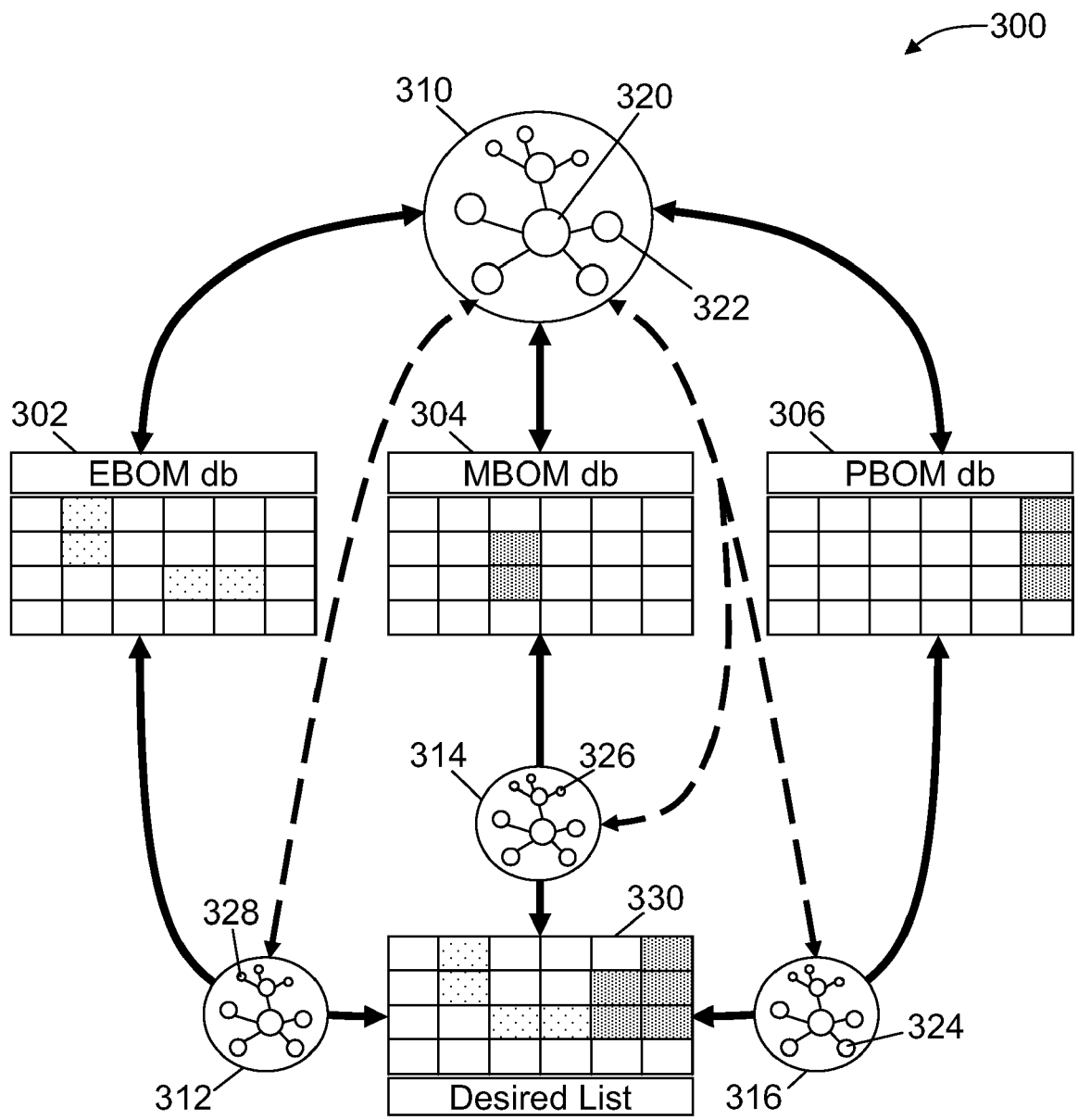
FIG. 7 is an illustration of a unified BOM architecture for a semantically enabled, unified BOM process.

FIG. 7 is a diagram illustrating a semantically enabled unified BOM process 300. As further described, the primary ontology model in a large circle interacts with the various BOM databases for data access and retrieval and the secondary ontology models represented by small circles interact with the primary ontology model as well as BOM databases in order to help the user compose the retrieved BOM data set.

Process 300 depicts an architecture for user operations in terms of searching, validating, retrieving, and organizing BOM data from the various BOM data sources (e.g. an EBOM (Engineering Bill of Materials) database 302, a MBOM (Manufacturing Bill of Materials) database 304, and a PBOM (Purchase Bill of Materials) database 306). User operations are represented by large and small bubbles with a set of connected black dots. The one large bubble 310, illustrates an ontology model that provides a user interface for launching the functions of search, retrieval, and reporting BOM data from multiple sources, and reports the results of functional operations collected by small bubbles. The small bubbles, of which 312, 314, and 316 perform communications and collections between the various individual BOM databases for the user requests and assist the users to organize a desired BOM list 330.

The spread-sheet like rectangles of FIG. 7 indicate the data within BOM databases 302, 304, and 306, and the custom data within the desired BOM list 330, which is configured in one embodiment in a database format.

The unified BOM architecture of FIG. 7 supports concurrent access by more than one user. Multiple product development functions can launch the BOM operation at any time through the same large bubble when available for access. Each user is able to access their organization's BOM database for validating the BOM contents, retrieving, or composing a set of discrete BOM data. This capability allows the users to organize a modular BOM as well as a configurable BOM.

A modular BOM defines component materials, documents, parts and engineering drawings needed to complete a sub-assembly. While the term BOM and modular BOM are most commonly used in association with physical products, it is to be understood that the concept can be used in a variety of industries. The modular BOM is a critical element in defining the product structure of an end-item. A configurable BOM is used by industries that have multiple options or highly configurable end-items. The configurable BOM is used to create end-items without much work-effort needed to maintain product structure. Each individual user can visit all BOM databases within infrastructure remotely and compose a desired list. It is also possible to generate a composite BOM by collaboration with suppliers who have valid access permissions.

Figure 8:
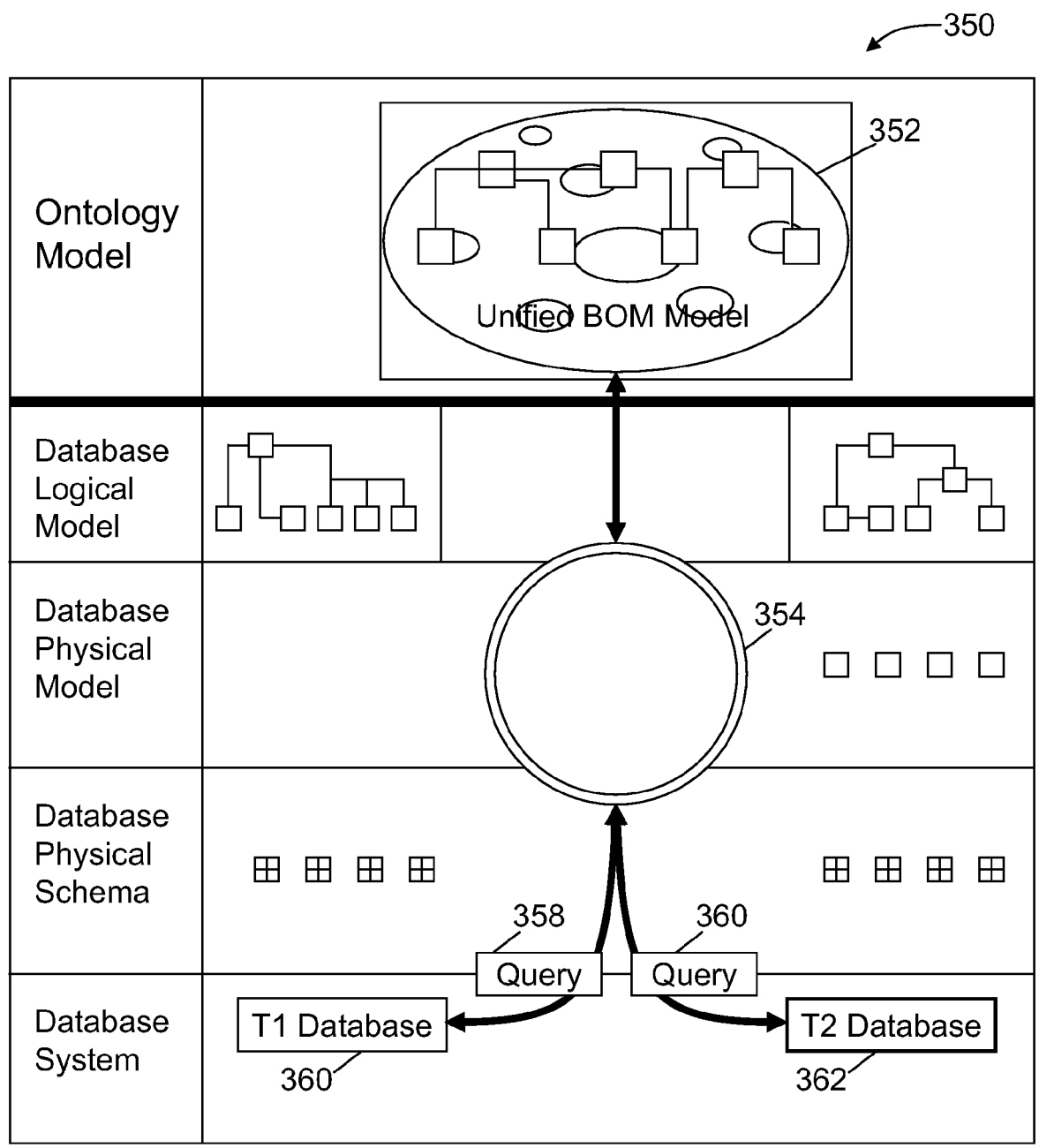
FIG. 8 is a block diagram of a search and retrieval mechanism with a capability of managing multiple BOM databases for a unified BOM ontology model.

FIG. 8 is a block diagram 350 of a search and retrieval mechanism for a unified BOM ontology model 352. The search and retrieval mechanism illustrates a physical architecture for implementing the UBOM method described elsewhere herein into a system. The ontology model 352 enables users to make a single query 354 that is utilized to generate individual queries 356, 358 (for each distinctive database type) for scanning the various BOM databases (360 and 362 in the illustrated embodiment) and/or retrieving the identified BOM data. In certain embodiments, mapping to a logical or physical database structure may be required in advance depending on the database implementation.

The architecture of block diagram 350 is intended to support accessing and operating multiple databases (360 and 362) without requiring any extra efforts from a user other than making a single query 354 to the databases (360 and 362). There is no limitation in terms of the number of databases the described UBOM method can support. In addition, there is no restriction in terms of physical distance among databases. Stated differently, the operations performed by the users are the same regardless of the number of BOM databases, the type of databases, and the geographical distance between the individual databases.

Figure 9:
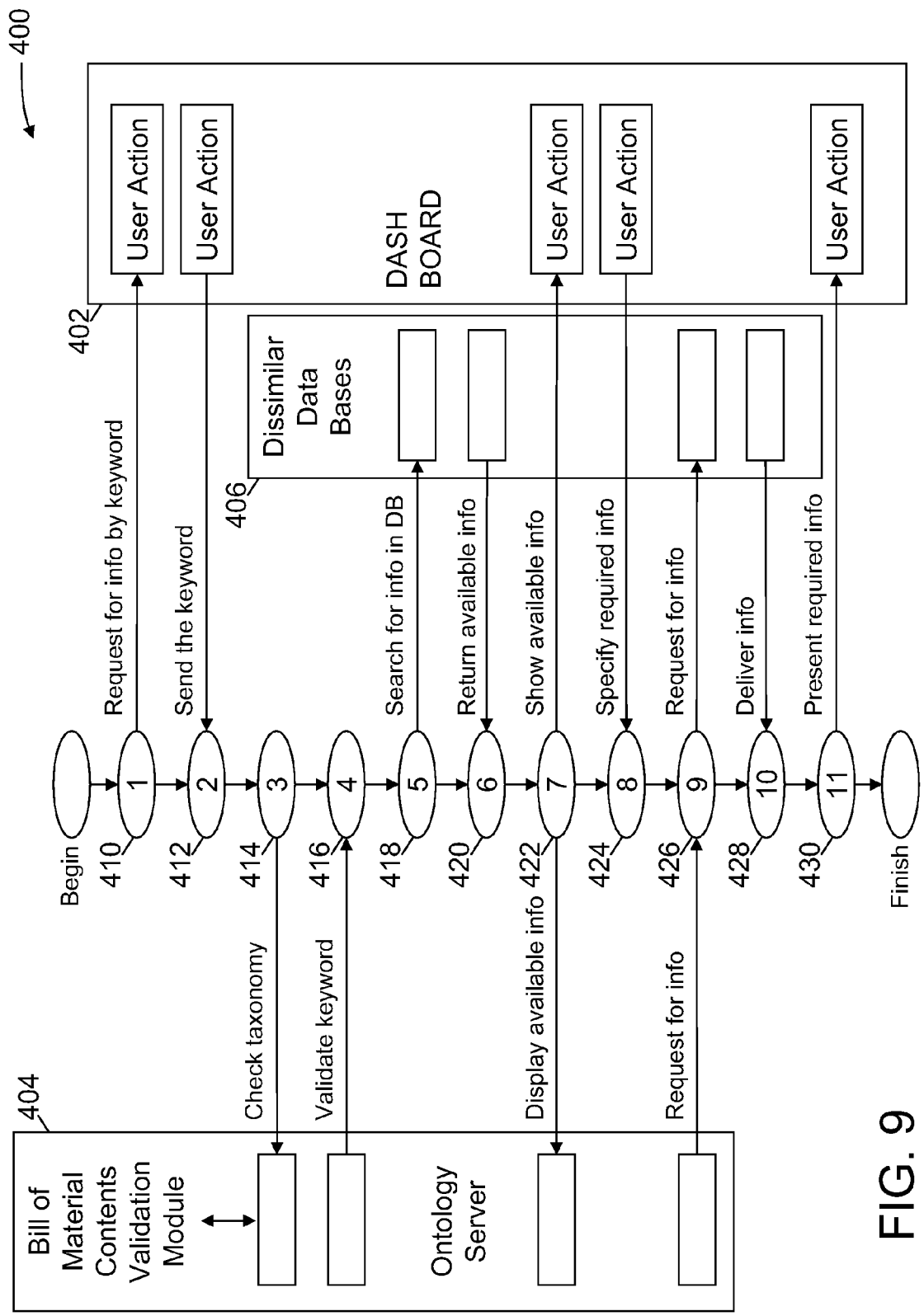
FIG. 9 is a flow diagram that illustrates a sequence of user and machine interface operations for accessing data that is found in various bill of material databases.

The unified BOM user scenario of FIG. 9 includes a flow diagram 400 that illustrates a sequence of user operations for accessing data that is found in various bill of material databases. User actions are symbolized in dash board 402 which include requests, inputs, selects, or other actions. An ontology server 404 illustrates ontology model responses or actions to user requests or database queries from the dissimilar databases 406.

Now referring to the flow diagram 400, a user requests 410 information through a keyword search and sends 412 one or more keywords. The keywords are received by the ontology server 404 which checks 414 the taxonomy of the user supplied keywords. The ontology server 404 then validates 416 the user supplied keywords.

The ontology server 404 utilizes an ontology model to check the user key words and generate a proper query to the various, dissimilar databases 406 based on the taxonomy and the validated keyword. The query is sent 418 to the various databases 406. The databases return 420 responses that include a listing of the available information in the respective database that includes the keywords.

The ontology server 404 lists and displays 422, (may be 424, or 430) all of the available information in the dashboard 402 for the user to review. The user then selects or specifies 424 which of the available information they wish to retrieve from the databases. This specification 424 is entered via a user interface in the dashboard 402. When the ontology server 404 receives the selection of data to be retrieved, it then generates a query requesting 426 retrieval of the user selected information from the databases 406. The databases 406 respond 428 with the retrieved data, as selected by the user, to the ontology model 404. The ontology model 404 then provides 430 the retrieved data to the dashboard 402 where it can be viewed or otherwise received by the user. All of the information is presented 430 to the user via the dashboard 402 can be captured and stored separately, via the dashboard user interface, for further operations such as developing the modular BOM or a configurable BOM.

The ontology server 404 receives instructions from the dashboard 402 and data from the databases 406 that are machine readable such that domain knowledge can be stored thereon for reuse at a later time. The semantics facilitate automated execution of these instructions across domains and permits users to retain (or store) the needed explicit domain knowledge within ontology sever-based system when technology and computers associated with the databases change.

The described embodiments include a context driven tool for BOM information exchange thereby supporting various perspectives of business domains and entities in the product lifecycle. A capability of using such technology is superior to existing solutions in terms of productivity, proficiency, and profitability. As further described herein, the embodiments include a BOM ontology base and an interpretation layer. The BOM ontology base is a process model depicting process steps (activities), relations of activities, data flows, and process objects. The interpretation layer provides rules (transformed from ontology axioms) and constraints to apply when executing the unified BOM process models. The result is a user capability to search, retrieve, take-in, and edit against the ontology server and any database based on the user specification. One automated capability is the scanning of the entire database with rules selected by the users. The user is also allowed to identify and command the extraction of specific data from the target database. A capability of composing multi-domain data by using a customizable template is also provided. The BOM ontology base model can utilize nearly any process modeling package with a standard interface such as XMI, RDF, or OWL. Additionally, several commercial tools for standard interfaces with proprietary features may be included.

The described embodiments provide a consistent access method for required (user desired) BOM data over a multitude of heterogeneous systems regardless of their location and database format. The described semantic driven and unified database access process improves the operational efficiency plus the effectiveness in global business collaborations.

The described embodiments provides a user with both the requested data, plus the meaning for every operation associated with the data, while also being less susceptible than existing systems to application changes. Inherent integration capability is provided in a networked environment across domains or companies, while still providing a low-cost product lifecycle support.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for presenting a user with a unified bill of material from a plurality of bills of materials stored in a plurality of databases, said method comprising:
   receiving at least one keyword from the user;
   querying a taxonomy associated with the at least one keyword;
   utilizing a semantic based ontology model to generate queries for forwarding to the databases, the queries based on the taxonomy and the at least one keyword by composing semantic primitives from principal knowledge elements within a computer readable model, the knowledge elements including at least one of meaning associated with a context such as one or more of business values, steps, and parts to produce, expression representing explicit knowledge, associated with a specific context, and symbol representing explicit knowledge, associated with a common sign for communication among semantics and providing a mechanism to combine or integrate dissimilar concepts, relationships, and knowledge;
   receiving from the databases, a listing of the available information stored in the databases that includes the at least one keyword;
   presenting the listing to the user;
   receiving from the user, based on the listing, a selection of the available information for retrieval from the databases;
   generating a query requesting retrieval of the user selected information from the databases;
   receiving the retrieved information from the databases; and
   providing the retrieved information to the user in an organized format.

2. The method of claim 1 wherein querying a taxonomy associated with the at least one keyword comprises validating the at least one keyword.

3. The method of claim 1 wherein presenting the listing to the user comprises utilizing a dashboard to list and display the available information that includes the at least one keyword for user review.

4. The method of claim 1 wherein receiving from the user a selection of the available information for retrieval from the databases comprises entering the selection through a user interface in the dashboard.

5. The method of claim 1 further comprising storing the retrieved information.

6. The method of claim 1 wherein utilizing an ontology model to generate queries for forwarding to the databases comprises generating semantically enabled queries to identify user requested bill of materials information by context.

7. A system configured to provide a unified bill of materials to a user from a plurality of bills of materials, said system comprising:
- a user dashboard comprising a user interface;
- a plurality of databases each having a bill of materials stored therein, at least two of said databases having a bill of materials stored in respectively different formats, said user dashboard configured to provide an ability to scan said databases to automatically search for keyword related items; and
- an ontology server communicatively coupled to said user dashboard and said databases, said ontology server configured to:
  - receive at least one keyword from said user dashboard via said user interface;
  - query a taxonomy associated with the at least one keyword;
  - utilize an ontology model to generate queries for identifying and forwarding to said databases, the queries based on the taxonomy and the at least one keyword, said ontology server configured to compose semantic primitives from principal knowledge elements within a computer readable model, the knowledge elements including at least one of meaning associated with a context such as one or more of business values, steps, and parts to produce, expression associated with a specific context, and symbol representing explicit knowledge, and symbol, representing explicit knowledge, and associated with a common sign for communication among semantics and a mechanism for combining or integrating dissimilar concepts, relationships, and knowledge;
  - generate a listing of the available information stored in said databases that includes the at least one keyword based on received responses to the queries for display on said user interface;
  - receive selections from said user dashboard of the available information to be retrieved from said databases;
  - generate queries requesting retrieval of the selections from the databases, the queries in a format compatible with the at least two databases;
  - receive the retrieved information from the respective databases; and
  - provide the retrieved information representing explicit domain knowledge to the user.

8. The system of claim 7 wherein to query a taxonomy associated with the at least one keyword, said ontology server is configured to validate the at least one keyword.

9. The system of claim 7 wherein to generate a listing of the available information stored in said databases, said ontology server is configured to list and display the available information that includes the at least one keyword for user review utilizing said dashboard.

10. The system of claim 7 wherein said ontology server is configured to store the retrieved information in at least one of said databases.

11. The system of claim 7 wherein to utilize an ontology model to generate queries for identifying and forwarding to said databases, said ontology server is configured to generate semantically enabled queries to identify user requested bill of materials information by context.

12. A network comprising:
- a plurality of communicatively coupled computers; and
- a plurality of databases, at least two of said databases having a bill of materials stored therein, at least two of the bill of materials stored in respectively different formats, one of said computers programmed with a user dashboard and further configured to provide access to an ontology server executed one of said computers:
- the one of said computers programmed to access a semantic based ontology model operating on said ontology server to generate queries for forwarding to said databases, the queries based on a taxonomy and an associated one keyword;
- said ontology server configured to:
  - compose semantic primitives from principal knowledge elements within a computer readable model, the knowledge elements including at least one of meaning which includes one or more of business values, steps, and parts to produce, expression describing a specific context, and symbol including common signs for communication among semantics to combine or integrate dissimilar concepts, relationships, and knowledge;
  - provide a selectable listing of the available information stored in said databases, the available information provided as a result of the queries;
  - receive, via entry through said user dashboard, a user selection of one or more of the available information for retrieval from said databases;
  - request retrieval of the user selections from said databases; and
  - provide the retrieved information to the user in an organized format at the one of said computers.

13. The network of claim 12 wherein the ontology server is programmed to generate semantically enabled queries to identify user requested bill of materials information by context.

14. The network of claim 12 wherein the ontology server is programmed to convert a described semantics structure to a computer readable map for execution of intelligent functions via a standard framework.

* * * * *